United States Patent [19]

Price

[11] 4,341,178
[45] Jul. 27, 1982

[54] METHOD OF AND APPARATUS FOR DETECTING LEAKAGE INTO THE BILGE OF A SEA VESSEL

[76] Inventor: Douglas R. Price, 1406 Locust Ave., Ruxton, Md. 21204

[21] Appl. No.: 52,596

[22] Filed: Jun. 27, 1979

[51] Int. Cl.³ .................. B63B 13/00; B63B 29/16; B63B 37/00
[52] U.S. Cl. .................. 114/183 R; 417/63; 73/290 R; 116/109; 340/602
[58] Field of Search .................. 417/43, 63; 73/308, 73/290 R; 318/642; 114/183 R, 184; 116/109, 110, 112; 340/602, 625, 606, 609

[56] References Cited

U.S. PATENT DOCUMENTS

| 766,811 | 8/1904 | Cogan | 73/308 |
|---|---|---|---|
| 2,537,498 | 1/1951 | Wickesser | 318/642 |
| 2,803,300 | 8/1957 | Warkentien | 318/642 |
| 2,889,780 | 6/1959 | Binford | 417/63 |
| 2,950,683 | 8/1960 | Leopold | 417/63 |
| 3,164,095 | 1/1965 | Williams | 417/63 |
| 3,256,685 | 1/1966 | Siewert | 417/63 |
| 3,779,457 | 12/1973 | Cornyn | 417/63 |
| 3,946,694 | 3/1976 | Belsky | 114/183 R |
| 4,020,488 | 4/1977 | Martin | 340/605 |
| 4,032,259 | 6/1977 | Brown | 417/43 |
| 4,050,396 | 9/1977 | Ridgeway | 114/183 R |
| 4,076,458 | 2/1978 | Jones | 417/63 |
| 4,187,503 | 2/1980 | Walton | 340/602 |

OTHER PUBLICATIONS

Leak Alert Brochure.

Primary Examiner—Trygve M. Blix
Assistant Examiner—D. W. Keen

[57] ABSTRACT

In a sea vessel having a bilge pump energized in response to bilge water level, an operating parameter of the bilge pump, such as on-time or water output, is monitored and compared with a normal or expected reference value of the parameter to indirectly detect leakage into the bilge. The reference value may be manually set by the operator or may be automatically set in response to circuitry for obtaining the running average of the parameter previously monitored. In one embodiment, an alarm is triggered if the reference is exceeded by the monitored parameter indicative of excessive leakage. In a second embodiment, the monitored parameter is compared with two references. A first alarm at the vessel is triggered if the monitored bilge pump parameter is above the first reference indicating slightly excessive leakage into the bilge whereas a second alarm, which may be remote, is triggered if the monitored parameter is above the second, higher reference indicating grossly excessive leakage.

23 Claims, 4 Drawing Figures

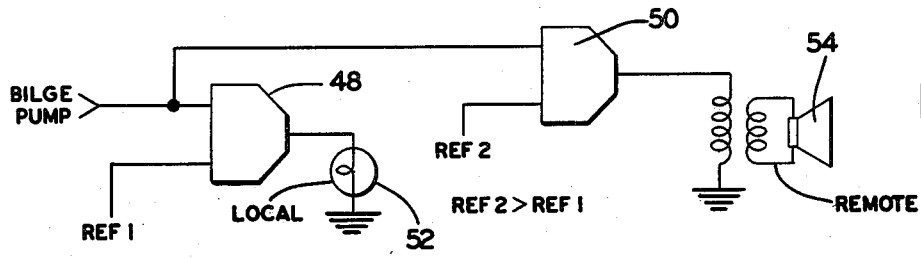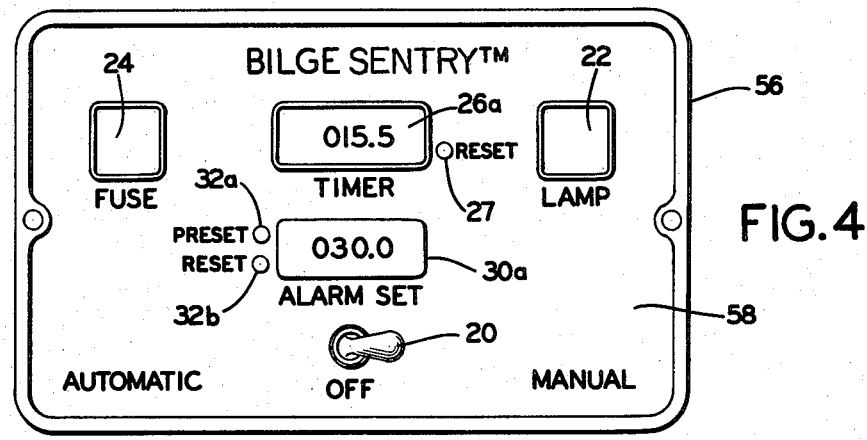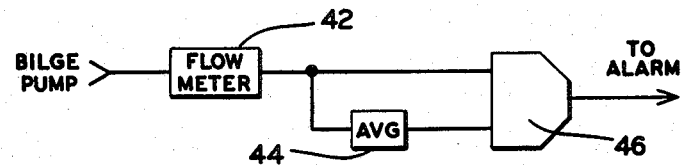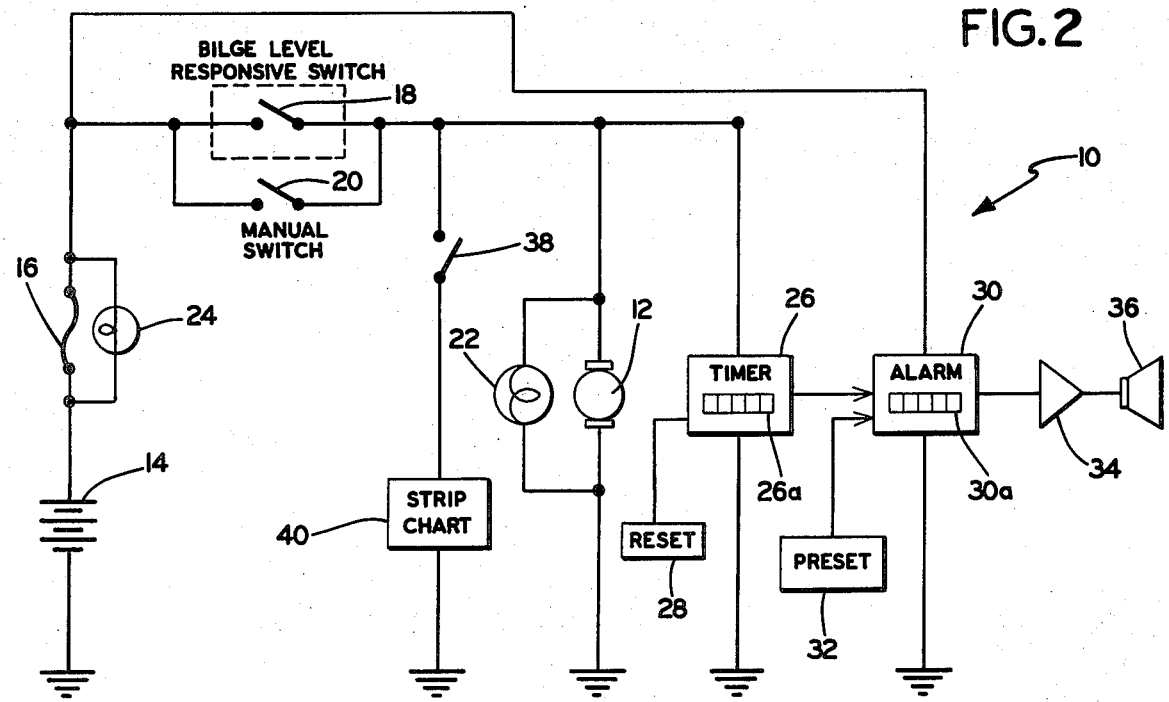

METHOD OF AND APPARATUS FOR DETECTING LEAKAGE INTO THE BILGE OF A SEA VESSEL

BACKGROUND OF THE INVENTION

The present invention relates generally to methods of and apparatus for detecting leakage of seawater into the bilge of a sea vessel, and more particularly, toward a unique method of and apparatus for indirectly monitoring leakage into the bilge by monitoring bilge pump operation.

There is typically at least a small amount of leakage of seawater into the bilge of even the most seaworthy vessels. The operator will generally become aware of water in the bilge by periodic inspection or, in extreme cases, by noticing sluggishness in boat performance caused by the weight of seawater inside the bilge.

Seawater inside the bilge of a vessel is generally removed by a bilge pump which is a battery powered pumping unit that pumps bilge water overboard either in response to a manual switch or automatically in response to the level of seawater in the bilge. In the latter case, a seawater level detector inside the bilge detects when the seawater is at a predetermined level and electrically energizes the bilge pump through a relay until most of the bilge water is pumped overboard.

If there is excessive leakage of seawater into the bilge, the bilge pump will be maintained in operation for a period of time greater than the norm, and in extreme cases, the bilge pump will be maintained continuously on until the battery is exhausted. In the event that inflow of seawater into the bilge is greater than the capacity of the bilge pump, the level of seawater will rise in the bilge with catastrophic results.

In order to alert the operator that there is excessive water in the bilge, electrodes have been located in the bilge to energize an alarm when the bilge water has exceeded a predetermined level. The disadvantage of a bilge water level type of warning system, however, is that by the time the alarm is activated, it is already too late; the bilge is filled with water and there may not be enough time or any practical means for removing it.

One object of the present invention, therefore, is to provide a new and improved method of and apparatus for detecting leakage of water into a sea vessel.

Another object is to provide a method of and apparatus for detecting excessive rate of leakage of seawater into a sea vessel before a substantial amount of water has entered the bilge.

Another object of the invention is to provide a new method of and apparatus for anticipating excessive leakage of water into the bilge of a sea vessel.

Another object of the invention is to provide a method of and apparatus for detecting excessive leakage into the bilge of a sea vessel and for identifying the degree of leakage.

Another object is to provide a method of and apparatus for detecting excessive leakage of water into the bilge of a sea vessel and, in response, triggering an alarm to notify the operator or others.

SUMMARY OF THE INVENTION

In accordance with the invention, leakage of seawater into the bilge of a sea vessel is monitored indirectly by monitoring the operation of the bilge pump and correlating pump operation with inflow of seawater to the bilge. An operating parameter, such as the quantity of seawater pumped by the bilge pump or the on-time of the bilge pump is accumulated over a predetermined period of time and compared with a corresponding reference parameter. If the monitored parameter is greater than the reference parameter, leakage of seawater into the bilge is considered to be excessive and an alarm is triggered.

A permanent record of bilge pump operation may be generated by a strip chart recorder electrically connected to the bilge pump to record the monitored parameter as a function of time. The record may be used to determined normal bilge leakage for deriving the value the reference which, if exceeded by the monitored parameter, is considered to represent excessive leakage.

In accordance with one embodiment of the invention, the reference value of the operating parameter is manually set by the operator to a value determined by inspecting the strip chart output or by experience; the operator knows, for example, how many gallons of seawater are typically pumped or how many hours the bilge pump is operating during a predetermined time period. In accordance with another embodiment, the reference is developed by electronic circuitry that measures and stores a running average of the monitored operating parameter.

In accordance with a further embodiment of the invention, the monitored bilge pump parameter may be compared with first and second, successively higher references rather than with a single reference. If the monitored bilge pump operating parameter exceeds the first reference, a first alarm inside the vessel, such as a lamp, is triggered to alert the operator. If the second reference is exceeded by the monitored parameter, an audible or remote alarm is triggered that will alert personnel outside the vessel that the bilge is undergoing excessive leakage.

Still other objects and advantages of the present invention will become readily apparent to those skilled in this art from the following detailed description, wherein I have shown and described only the preferred embodiments of the invention, simply by way of illustration of the best modes contemplated by me of carrying out my invention. As will be realized, the invention is capable of other and different embodiments, and its several details are capable of modifications in various obvious respects, all without departing from the invention. Accordingly, the drawings and description are to be regarded as illustrative in nature and not as restrictive.

DESCRIPTION OF THE DRAWING

FIG. 1 is a circuit diagram of a bilge leak detector measuring bilge pump on-time in accordance with one embodiment of the invention;

FIG. 2 is a circuit diagram of a flow monitoring and averaging circuit used in the bilge leakage detector in accordance with a second embodiment of the invention;

FIG. 3 is a circuit diagram of another embodiment wherein a bilge pump operating parameter is compared with first and second references to trigger local and remote alarms; and FIG. 4 is a front view of the panel of the bilge leakage detector.

DETAILED DESCRIPTION OF A PREFERRED EMBODIMENT

Referring to FIG. 1, a circuit 10 for indirectly monitoring leakage of seawater into the bilge of a sea vessel by accumulating a bilge pump operating parameter comprises a conventional bilge pump 12 energized by a battery 14 through fuse 16 and switches 18, 20. Switch 20 is a conventional manual switch enabling the operator of the vessel to operate the bilge pump and thereby drain the bilge on command. The switch 18 is a conventional bilge level responsive switch that is closed automatically when the bilge water reaches a predetermined level to pump bilge water overboard. A first lamp 22 is connected across bilge pump 12 and is energized together with the bilge pump to provide a visual display of bilge pump operation in a conventional manner. A second lamp 24 connected across fuse 16 is normally bypassed by the fuse. In the event that the fuse 16 is blown, however, the lamp 24 is energized by battery 14 to provide a blown fuse indication.

The operation of bilge pump 12 is monitored over a period of time to provide an indication to the operator of the vessel of the amount of bilge water pumped overboard which is related to leakage of seawater into the bilge. In accordance with one embodiment of the invention, a timer 26 is connected across the bilge pump 12 to accumulate operating time of the bilge pump. The timer 26 accumulates successive operating intervals of the bilge pump 12 and is not reset until manually reset by a reset switch 28. For example, if the bilge motor operates during seven two-minute intervals over a one hour time period, the timer will be accumulated to fourteen minutes. The accumulated time is displayed on a digital readout 26a.

The output of timer 26 is supplied to an alarm 30 which is a comparator that compares the output of the timer 26 with a preset time developed by preset unit 32. When the accumulated output of time 26 is equal to the output of preset 32, alarm 30 generates a signal through amplifier 34 to a speaker or other alarm 36. Whereas the timer 26 is connected to battery 14 through switches 18 and 20 to be operative only when pump 12 is energized, the alarm 30 is connected directly to the battery 14 through fuse 16 to operate continuously once triggered independently of the position of switches 18 and 20.

Also connected across the bilge pump 12 through a switch 38 is a conventional strip chart 40 which provides a permanent record of the operation of the bilge pump over a relatively long period of time. The strip chart is used to provide an indication of bilge operation as a function of time and may be used to derive the value of preset 32 above which bilge leakage is considered to be excessive.

The operator of the vessel will periodically note the output of time 26 which is a function of the amount of time of operation of the bilge pump 12. An excessive time displayed on timer 26 over a predetermined time interval will alert the operator that leakage of seawater into the bilge is excessive. For example, knowing that 20 gallons per day of leakage into the bilge is typical by inspection of the output of strip chart 40 or by experience, the operator will note the output of timer 26 at the same time each day and then reset the timer. Any increase in reading from day to day will be advance warning that leakage of seawater into the bilge is increasing and corrective action must be taken.

Alternatively, the operator may preset a maximum accumulated operating time of bilge pump 12 in preset unit 32. For example, if the operator will be away from the vessel for several days, he will preset the alarm 30 with preset unit to correspond to the maximum permissible operating time of bilge pump 12 over the several days time duration. In the event that the actual operating time of the bilge pump 12 exceeds the preset amount, alarm 30 will be triggered to operate the speaker 36. The speaker 36 will alert dock personnel that the vessel is taking on excessive seawater.

As another possibility, the operator may set the preset unit daily to the maximum permissible daily operating of bilge pump 12, e.g., 30 gallons, to be alerted if the maximum is exceeded. The operator may be awakened at night, for example, by the speaker 36 indicating that there is excessive leakage of seawater into the bilge.

Thus, the circuit 10 provides an indirect means of monitoring leakage of seawater into the bilge on either a short term or long term basis. It can be appreciated that the circuit 10 also provides a means for personnel to anticipate catastrophic intake of seawater at early stages of excessive leakage by either periodically observing the timer 26 or the strip chart 40.

Whereas the operating time of bilge pump 12 is monitored to provide an indirect indication of seawater into the bilge, it is to be understood that other operating parameters related to intake of bilge water may be monitored. For example, a conventional flow meter 42 (FIG. 2) may be provided to monitor the amount of bilge water pumped overboard for comparison with a reference.

Also, whereas the present reference parameter is preset in unit 32 (FIG. 1) by the operator based upon prior experience or by inspection of the output of strip chart 40, the preset may be automatically adjusted, as shown in FIG. 2, by supplying the output of flow meter 42 into an averaging circuit 44, such as a conventional long time constant integrator, to be supplied to one input of a comparator 46. The other input of comparator 46 is connected directly to the output of flow meter 42. The circuit of FIG. 2 will generate an alarm signal at the output of comparator 46 whenever the instantaneous output of flow meter 42 exceeds the long term average output of flow meter 42 by a predetermined amount that is controlled internally of the comparator 46. For example, assuming that an average flow rate of 20 gallons per day of bilge water pumped by bilge pump 12 is measured, a sudden increase in bilge flow rate to, e.g., 30 gallons per day would be considered excessive and indicative of a defect. The alarm 20 would thus be triggered by comparator 46 very early to enable corrective action to be taken. Alternatively, the alarm 20 may be made responsive to the accumulated value of bilge water flow, similar to the strategy taken in FIG. 1, rather than flow rate.

Referring to FIG. 3, the bilge pump operating parameter may be compared with first and second, successively higher references, rather than with a single reference, to indicate the degree of excessive bilge leakage. If the first reference is exceeded by the monitored bilge pump parameter, indicating slightly excessive leakage, a local signal may be triggered to enable the operator to observe the condition of the bilge. In the event that the second higher reference is exceeded, indicating catastrophic leakage, a second alarm that may be remote is triggered to alert dock personnel as well as the operator of the vessel.

Still referring to FIG. 3, the output of the bilge pump operating parameter generating means, which may be an electrical signal to timer 26 or flow meter 42, is supplied to one input of a first comparator 48 and also to one input of a second comparator 50. A first reference signal REF 1 is supplied to the comparator 48 whereas a second, higher reference signal REF 2 is supplied to comparator 50. The output of comparator 48 is connected to a lamp 52; the output of comparator 50 is supplied to a speaker 54 through an oscillator and amplifier circuit (not shown). The "trouble" lamp 52 is preferably inside the cabin of the vessel to alert the operator that bilge water leakage is slightly above normal, whereas the speaker 54 is positioned so as to alert all personnel on board as well as any dock personnel that bilge water leakage is substantially above normal. The speaker 54 may, of course, be any other suitable alarm mechanism and may be located outside the vessel, such as at a dock master's quarters or coupled to the telephone lines to alert the boat owner at his home.

Referring to FIG. 4, the circuit 10 is preferably packaged within a plastic case 56 that is sealed. The front panel 58 of the case 56 contains the manual switch 20 for selecting manual or bilge water level responsive operation of the bilge pump 12. The timer 26 digitally displays at 26a the accumulated operating time of bilge pump 12, whereas alarm 30 displays at 30a the reference (maximum operating time) preset on unit 32. The reference setting of alarm 20 is manually adjusted by preset and reset controls 32a and 32b whereas the timer 26 is manually reset by switch 26a. Also displayed on front panel 38 are fuse lamp 24 and bilge pump operating lamp 22. Outlets (not shown) for strip chart 40 and alarm lamps or speakers are located on the sides or rear of case 56.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

What I claim is:

1. In a vessel having a bilge pump for pumping bilge water overboard and means responsive to bilge water level for operating said bilge pump, a method of detecting excessive leakage of water into the bilge, comprising the steps of monitoring on time of the bilge pump; numerically accumulating the on time of said bilge pump over a period of time; and correlating the accumulated on time of the pump for the period of time with an expected accumulated on time for normal bilge water leakage for said period of time to identify excessive bilge water leakage and, in response to said correlating step, providing an indication of excessive or non-excessive bilge water leakage.

2. An apparatus for detecting excessive leakage into a vessel having a bilge pump for pumping bilge water overboard in response to bilge water level, comprising means for monitoring operation of said bilge pump, means for numerically accumulating an operating parameter of said bilge pump and means for comparing the accumulated parameter over a period of time with a reference value of said accumulated parameter, wherein said operating parameter is an on time of said bilge pump, including timer means for measuring said on time of said bilge pump, wherein said reference value is an average value of said operating parameter previously monitored, including means for obtaining a running average of said operating value and means responsive to said averaging means for setting the reference value supplied to said comparing means.

3. An apparatus for detecting excessive leakage into a vessel having a bilge pump for pumping bilge water overboard in response to bilge water level, comprising means for monitoring operation of said bilge pump, means for numerically accumulating an operating parameter of said bilge pump and means for comparing the accumulated parameter over a period of time with a reference value of said accumulated parameter, wherein said operating parameter is an on time of said bilge pump, including timer means for measuring said on time of said bilge pump, wherein said bilge pump includes means for selectively controlling said pump in a bilge water level responsive mode and in a manual mode, said parameter accumulating means being operative in both said water level responsive mode and said manual mode of said bilge pump.

4. The method of claim 1 wherein said correlating step includes comparing said accumulated on time with first and second reference values of said accumulated on time.

5. The method of claim 4, including the step of generating first and second alarms, respectively, in response to the comparison of said accumulated on time with said first and second reference values.

6. The method of claim 5, wherein said alarm generating step includes the steps of generating the first alarm at said vessel and generating the second alarm at a location remote from said vessel.

7. The method of claim 1, including the step of generating an alarm in response to the result of said correlating step.

8. The method of claim 1 wherein said expected on time is an estimated average value of said on time.

9. The method of claim 1 wherein said expected on time is a running average of said on time previously monitored.

10. An apparatus for detecting excessive leakage into a vessel having a bilge pump for pumping bilge water overboard in response to bilge water level, comprising means for monitoring on time of said bilge pump, means for numerically accumulating the on time of said bilge pump and means for comparing the accumulated on time over a period of time with a reference value of said accumulated on time, including timer means for measuring said on time of said bilge pump, means for displaying said numerical value of said bilge pump on time and alarm means energized in response to said monitored and reference accumulated on times.

11. The apparatus of claim 10 wherein said comparing means includes means for comparing the accumulated on time over a period of time with first and second, successively higher reference values of said accumulated on time parameter.

12. The apparatus of claim 11, including means for generating first and second alarm signals in response to said comparing means, said first alarm signal being generated when said accumulated parameter is between said first and second reference values, and said second alarm signal being generated only when said accumulated parameter is above said second reference value.

13. The apparatus of claim 12, including means for generating said first alarm signal at said vessel and means for generating said second alarm signal at a location remote from said vessel.

14. The apparatus of claim 10 including means for generating an alarm signal in response to said comparing means.

15. The apparatus of claim 14, including signal lamp means responsive to said alarm signal.

16. The apparatus of claim 14, including audible means responsive to said alarm signal.

17. The apparatus of claim 10 wherein said reference value is an estimated average value of said on time, including means for manually setting said reference value supplied to said comparing means.

18. The apparatus of claim 10 wherein said reference value is an average value of said on time previously monitored, including means for obtaining a running average of said operating value and means responsive to said averaging means for setting the reference value supplied to said comparing means.

19. The apparatus of claim 10, including recorder means for recording an output of said on time monitoring means.

20. In a vessel having a bilge pump for pumping bilge water overboard and means responsive to bilge water level for operating said bilge pump, a method of detecting excessive leakage of water into the bilge, comprising the steps of monitoring an amount of water pumped by said bilge pump; numerically accumulating a value of the amount of pumped water for a period of time; and correlating a value of the accumulated pumped bilge water for the period of time with an expected value corresponding to normal bilge water leakage to identify excessive leakage and, in response to said correlating step, providing an indication of excessive or non-excessive bilge water leakage.

21. An apparatus for detecting excessive leakage into a vessel having a bilge pump for pumping bilge water overboard in response to bilge water level, comprising flow meter means for monitoring an amount of water pumped by said bilge pump, means for numerically accumulating the pumped bilge water amount for a time period and means for comparing a value of the accumulated pumped bilge water amount with a reference value of said accumulated pumped bilge water amount for the time period; and alarm means energized in response to accumulated and reference values of said accumulated pumped bilge water amount.

22. The method of claim 1 or 20 including the step of displaying a result of said comparing step.

23. The method of claim 1 or 20 including the step of displaying the accumulated operating parameter on a strip chart.

* * * * *